Jan. 26, 1960 R. S. RANKIN 2,922,524
APPARATUS FOR TREATING SEWAGE AND SIMILAR MATERIALS
Original Filed Oct. 15, 1952 6 Sheets-Sheet 1

INVENTOR
RENVILLE S. RANKIN,
BY Hubbell and Cohen
ATTORNEYS

Jan. 26, 1960  R. S. RANKIN  2,922,524
APPARATUS FOR TREATING SEWAGE AND SIMILAR MATERIALS
Original Filed Oct. 15, 1952  6 Sheets-Sheet 3

INVENTOR
RENVILLE S. RANKIN,
BY Hubbell and Cohen
ATTORNEYS

Jan. 26, 1960 R. S. RANKIN 2,922,524
APPARATUS FOR TREATING SEWAGE AND SIMILAR MATERIALS
Original Filed Oct. 15, 1952 6 Sheets-Sheet 4
FIG. 5.
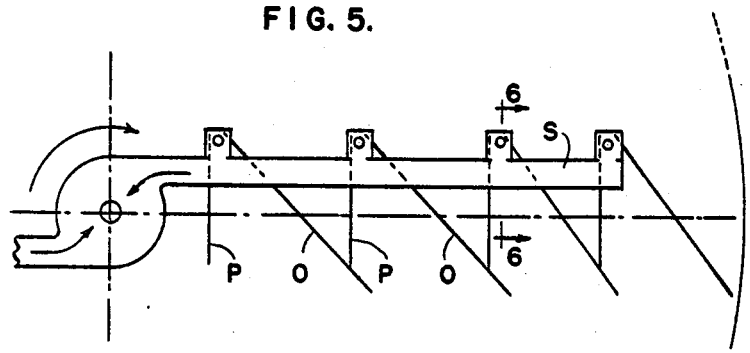
FIG. 7.
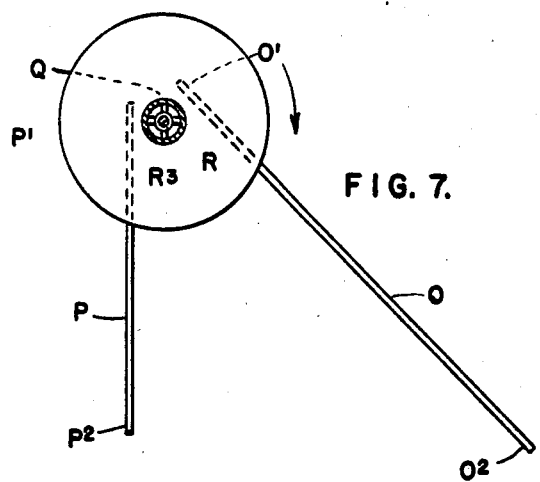
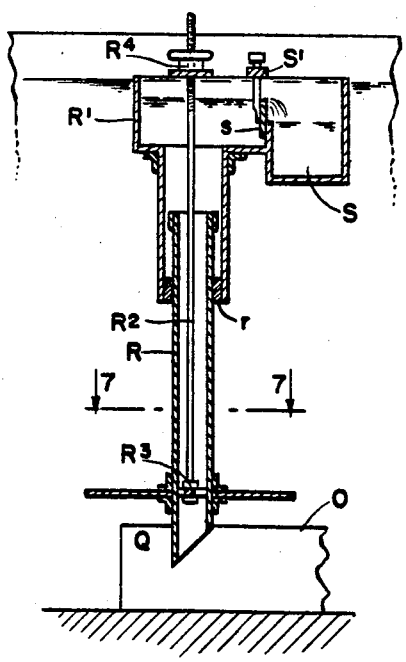
FIG. 6.                FIG. 8.
INVENTOR
RENVILLE S. RANKIN,
BY *Hubbell and Cohen*
ATTORNEYS Jan. 26, 1960 R. S. RANKIN 2,922,524
APPARATUS FOR TREATING SEWAGE AND SIMILAR MATERIALS
Original Filed Oct. 15, 1952 6 Sheets-Sheet 5

INVENTOR
RENVILLE S. RANKIN,
BY *Hubbell and Cohen*
ATTORNEYS

| ANNULAR SECTION | SECTION-RADII | | SECTION AREA | TOTAL | | TROUGH-FLOW |
|---|---|---|---|---|---|---|
| | OUTER | INNER | | GAL./DAY | CU.FT./SEC. | CU.FT./SEC. |
| I | 40'-0" | 32'-6" | 1710 | 891.000 | 1.38 | 0.69 |
| II | 32'-6" | 25'-3" | 1315 | 684.000 | 1.06 | 1.22 |
| III | 25'-3" | 16'-9" | 1120 | 583.000 | 0.91 | 1.675 |
| IV | 16'-9" | 8'-0" | 680 | 355.000 | 0.55 | 1.950 |
| | | | | TOTAL 2,513,000 | 3.90 | |
| $C_1$ | $C_2$ | $C_3$ | $C_4$ | $C_5$ | $C_6$ | $C_7$ |

INVENTOR
RENVILLE S. RANKIN,
BY *Hubbell and Cohen*
ATTORNEYS

United States Patent Office 2,922,524
Patented Jan. 26, 1960

2,922,524

APPARATUS FOR TREATING SEWAGE AND SIMILAR MATERIALS

Renville S. Rankin, Stamford, Conn., assignor to Dorr-Oliver Incorporated, Stamford, Conn., a corporation of Delaware Original application October 15, 1952, Serial No. 314,790, now Patent No. 2,820,758, dated January 21, 1958. Divided and this application May 1, 1957, Serial No. 656,284

13 Claims. (Cl. 210—219)

My present invention relates to the treatment of sewage in liquid form and similar materials.

This present application is a division of my earlier filed copending U.S. application, Serial No. 314,790, filed by me on October 15, 1952, now Patent No. 2,820,758, for Treatment of Sewage in Liquid Form and Similar Materials.

In the treatment of sewage and similar liquids the primary object is to remove their polluting elements which, if allowed to remain, will degrade the stream into which the liquids are discharged by robbing the stream of its essential oxygen. Treatment of these polluting liquids is usually accomplished by biologic oxidation processes in which aerobic bacteria function to oxidize the polluting elements and convert them into stable non-putrescible compounds. In the activated sludge process of biologic oxidation, for example, the oxidizing bacteria form nuclei which in turn appear as visible solids in suspension. These solids in suspension after circulating through the oxidation phase of treatment pass into a sedimentation tank where they are removed from the oxidized liquid and returned for re-use to the oxidation process. When these nuclei containing solids leave the oxidation step, the free oxygen so necessary to their life and function is no longer as plentiful and, as a consequence, they tend to draw on the available dissolved oxygen in the settling tank liquor. To minimize this depletion of oxygen and to maintain life and vigor to the oxidizing bacteria, it is essential to return the nuclei containing suspended solids to aeration section as quickly as possible.

The apparatus and methods heretofore used to rapidly return the suspended solids to the aeration section have proved defective in that they either take so much time that there is a marked deterioration in the quality of tank effluent or viability of the bacteria; or they endeavor to speed up the time of removal of the suspended solids without providing for the uniform removal of all of the nuclei carrying solids; or they include no provision for the removal of inert and gritty material separately from the desirable solids.

My present invention overcomes these defects and provides a positive and controlled means of rapidly withdrawing the desirable nuclei-carrying suspended solids and at the same time providing a means of separately removing the material consisting of inert solids and gritty materials which settle to the floor of the tank.

The primary purpose of the sedimentation tank is to separate the entrained solids in the feed from the liquid so as to produce a clarified effluent but, at the same time to separate and return as rapidly as possible the active solids as previously described. The active solids are not necessarily distributed uniformly over the entire settling area and some sections may have greater concentrations of settling solids than other areas. Heretofore, no attempts have been made to withdraw solids at different rates over the settling area in proportion to the concentrations of solids in those areas because no facilities were available to accomplish this function. My invention makes it possible to withdraw solids at varying rates at a number of radial points on the rotating mechanisms, thus providing selective solids withdrawal from various areas.

The adequacy of the facilities embodied in my invention for withdrawing the required volumes of solids for return to the aeration section can be readily illustrated, by comparing the performance of the typical activated sludge plant heretofore used with the performance of a plant of similar capacity which is constructed and operated in accordance with my invention. In the typical activated sludge plant heretofore used, the volume of "return" is on the order of twenty-five percent of the average flow undergoing treatment. Also, in said typical plant, the sedimentation tank following the aeration section is nominally rated at 1,000 gallons of effluent per square foot of gross tank area.

In the use of the present invention, the volume of "return" is usually larger than twenty-five percent. In the practice of my invention, the returned solids will normally be more dilute or less concentrated than in said typical prior plant, and the "return" may well be fifty percent by volume of the tank effluent. To be on the conservative side, particularly because the returned solids conceivably will be more dilute or less concentrated with the practice of my invention, we can assume the "return" to be fifty percent by volume of the tank effluent.

In the preferred mode of practicing the present invention, I make use of a sedimentation tank or clarifier of well known form which includes a rake structure slowly rotated about the tank axis, and blades or sweeps for working heavy solids collecting on the floor of the settling tank toward, and eventually into, a sludge discharge outlet. In accordance with the present invention, I combine the above mentioned sedimentation tank or clarifier and its rake structure with apparatus operative to withdraw relatively active suspended activated solids from the tank while working heavier and inert solids along the floor of the settling tank or clarifier to a separate sludge outlet.

In the preferred form of the invention, the draw-off apparatus includes a plurality of uprising draw-off pipes supported and rotated about the center column by the rake structure, and having their inlet ends adjacent the tank floor and at a different distance from the center column. Preferably, each draw-off pipe is subject to a control adjustment regulating the amount of suspended solids and entraining liquid withdrawn through said pipe. Said draw-off pipes are arranged to have their upper ends discharged into a radial collecting trough connected to the revolving rake structure. Each such collecting trough discharges into a conduit apparatus for returning the activated solids collected to the aeration section of the apparatus.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1a is a schematic diagram of an activated sludge treatment apparatus including the clarifier shown in Fig. 1;

Fig. 5 is a diagrammatic plan view of apparatus shown in part in Fig. 3;

Fig. 6 is an enlarged scale elevation in section on the line 6—6 of Fig. 5;

Fig. 7 is a plan section on the line 7—7 of Fig. 6;

Fig. 8 is a reproduction on an enlarged scale of a portion of the apparatus shown in Fig. 5;

Figure 1:
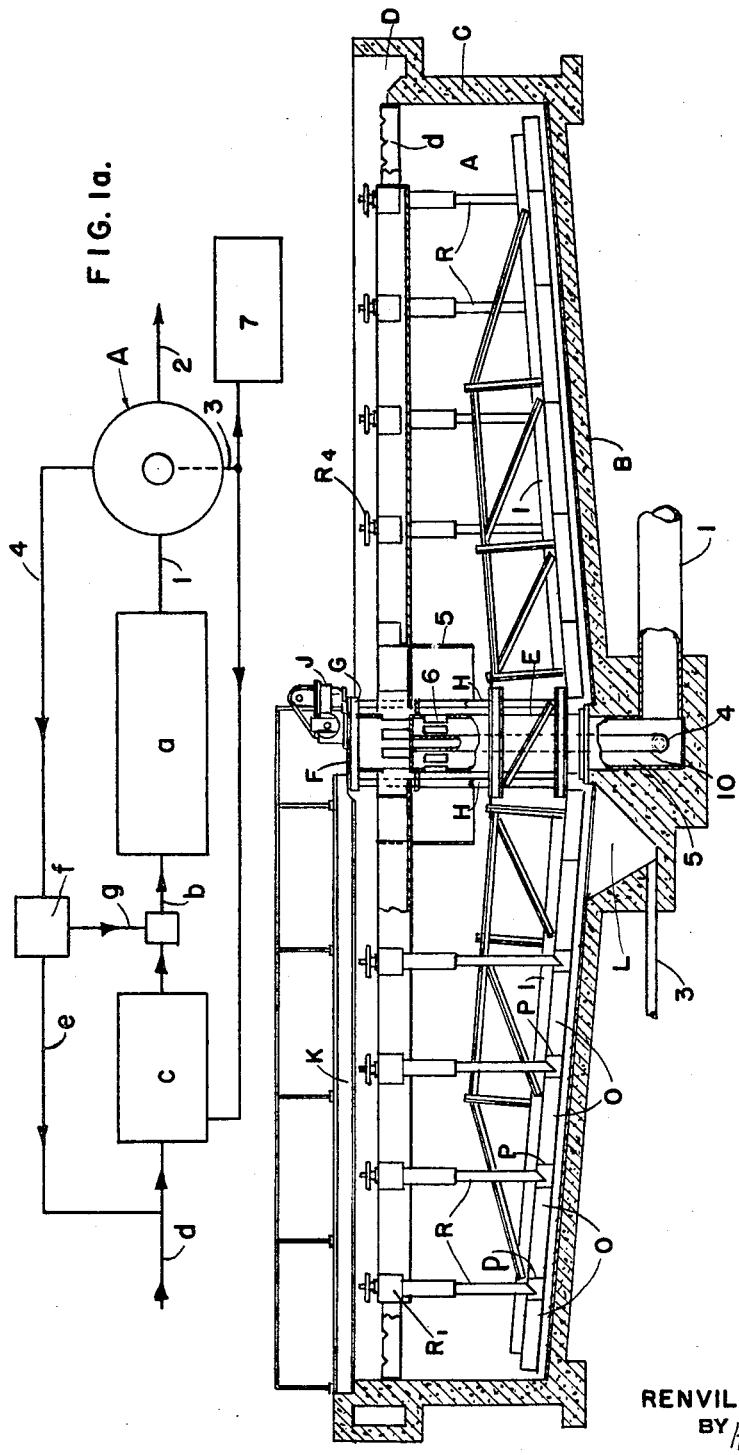
Fig. 1 is a sectional elevation of a clarifier.

In Fig. 1a I have schematically illustrated an activated sludge treatment system for use in the practice of the present invention. The apparatus shown in Fig. 1 includes a final sedimentation tank or clarifier A, with an inlet receiving activated sewage through a pipe 1 from an aeration section or unit $a$, an overflow outlet 2 for clarified liquid effluent, an outlet 3 for heavy and inert sludge, and an outlet 4 for suspended solids and entraining liquid to be returned to the aeration section $a$. As shown diagrammatically in Fig. 1a, the aeration section $a$ receives pretreated sewage through a conduit $b$ from a pre-treatment section $c$ which may be a preliminary sedimentation device receiving sewage through a supply conduit $d$. Settled solids to be returned to the section $a$ from the clarifier A, are passed to a splitter box $f$ from the clarifier A through its outlet 4. A portion of solids passed through the splitter box $f$, pass from the latter into a conduit $g$ and thence into the conduit $b$ for return to the aeration section $a$. Another portion of the solids are usually wasted, passing from splitter box $f$ through a conduit $e$, into the conduit $d$ and then to the primary tank $c$ or elsewhere.

As shown, the final sedimentation tank or clarifier A has a conical concrete bottom wall B, a vertical concrete peripheral wall C with a launder D at its upper end, and a hollow center column structure E. The latter may be formed of concrete or metal, and supports a non-rotatable operation table F at its upper end.. A turntable G supports a subjacent rake structure H which includes a pair of rake arms I extending radially away from the center column E, at opposite sides of said column. A motor drive mechanism J mounted on the operation table F, is arranged to rotate the turntable G and rake structure H in the clockwise direction about the tank axis. A conventional walkway K has one end resting on the peripheral wall C and has its other end resting on the operation table F.

Figure 2:
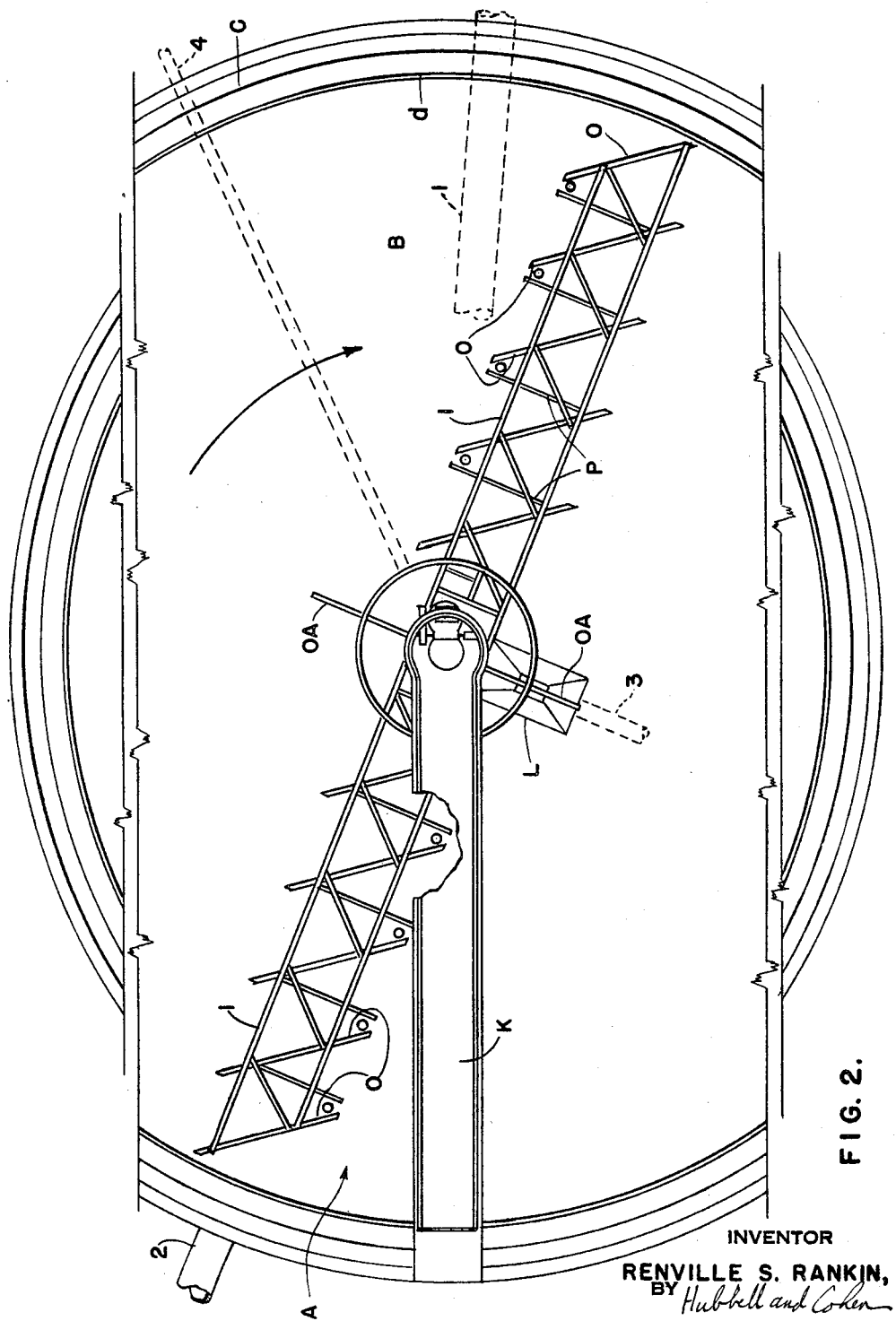
Fig. 2 is a plan view of the clarifier shown in Fig. 1, with parts broken away.

The sewage treated in the tank A is supplied to the latter through the influent pipe 1, which discharges into the lower end of the chamber space 5 in the hollow center column E. The sewage passes away from the chamber 5 through outlet ports 6 in the center column wall, which opens into the tank at a level somewhat below the level at which liquid overflows the weir plate $d$ which forms the upper portion of the inside wall of the launder D. As indicated by the arrow in Fig. 2, the rake structure shown rotates in the clockwise direction, but the apparatus may equally well be designed for counterclockwise rotation.

Each rake arm I supports a separate series or set of vertical bottom scraping blades O. The blades of each set are located at progressively increasing distances from the axis of the center column. As shown, the blades are all substantially parallel to one another and are inclined to their respective annular paths of movement about the tank axis. The blades O are of such length and so disposed that, as shown in Fig. 7, the trailing end O' of each outer blade is nearer the axis of the tank than is the leading end $O^2$ of the adjacent blade O at its inner side. Thus the trailing ends of different outer blades of each set move over annular portions of the tank bottom wall at progressively greater distances from the tank axis. Further, the trailing end O' of each outer blade O moves over an annular portion of the tank bottom wall or floor nearer to the tank axis than is the leading end $O^2$ of the adjacent blade at the inner side of the first mentioned blade.

The lower edges of the rake blades are in close proximity to the tank floor B, and with the direction of rake rotation and blade inclination described, each outer blade moves solids settling on the annular portion of the bottom wall surface portion over which the blade moves, into the annular path of the adjacent blade nearer to the center of the tank.. In consequence, the scraper blades O connected to the rake arms I and the scraper blades OA connected to the rake structure and extending redially away from the center column cooperate to move solid deposits on the tank bottom wall into a sludge receiving pocket or recess L in the tank bottom wall, adjacent the center column E. The sludge collecting in the pocket or recess L is withdrawn from the latter through a pipe 3 which may pass more or less of the heavy sludge from said recess to the preliminary treatment tank and the remainder to some other suitable receiver or sump..

Insofar as above described, the apparatus shown is typical of the settling tank or clarifier prior art, and includes nothing claimed as novel herein.

For the purposes of the present invention, I provide each rake arm with a set of vertical plates P, one adjacent to and at the inner side of each of the blades O which is too far way from the tank axis to move over the sludge pocket or recess L. Each plate P is inclined to the adjacent blade O at the trailing side of said plate so that the blade O and plate P are separated from one another by a tapered space Q. The trailing ends O' and P' of the blade O and deflector plate P at opposite sides of each tapered space Q are separated by a distance of 6 to 9 inches, while the leading ends $O^2$ and $P^2$ of said blade O and deflector plate P at opposite sides of each space Q may be separated by a distance of from 6 to 10 feet. The width of the leading end of each space Q may well decrease as the distance of said space from the axis of the tank increases, and the linear velocity of the side walls of said space Q' increases.

The blade O and deflector plate P at opposite sides of each tapered space Q may be regarded as forming the side walls of a solids deflector having its bottom formed by a corresponding annular section of the tank floor, and open at its upper side. While not essential, each deflector plate P may well be at an angle of 90°, to the radial direction of the supporting rake arm I, while each blade O may well diverge from the associated plate P at an angle of the order of 45°. Each of the blades O and plates P may have a vertical extent of a foot or so. The operative effect of the scoop or shovel formed by the blade O and plate P at opposite sides of a space Q is somewhat analogous to the action of a plow, in that it tends to laterally deflect all of the solids in the corresponding space into a row of a width depending on the width of the trailing end of the space Q.

In accordance with the present invention, the relatively active suspended solids are withdrawn from the narrow or trailing end of each space Q by a corresponding uprising draw-off pipe R connected to and rotated by the rake structure H. As shown, each draw-off pipe R has its lower end bevelled with its cut-away side facing away from the narrow end of the corresponding space. Ordinarily the bottom of the cut-away end of the draw-off pipe is separated from the adjacent portion of the tank bottom wall by a distance which may be as small as 6" and may be as great as two feet. As shown, each draw-off pipe R comprises upper and lower sections connected by a telescopic joint $r$. The upper section of each draw-off pipe R depends from a box-like chamber $R^1$ above the corresponding draw-off pipe. The chamber $R^1$ receives liquid entraining suspended solids through an opening in the bottom wall of said box.

Each receiving chamber $R^1$ is alongside and is mechanically connected to a radial trough S. There are two troughs S, one at each side of the center column E. The two troughs S have their adjacent ends connected to one another and to the rake structure H, as is hereinafter explained. The lower and upper sections of each draw-off pipe R are connected for axial adjustment of the lower section by a rod $R^2$ centrally disposed in the draw-off pipe and connected to the lower section of the pipe by a spider $R^3$ shown in Fig. 7. The upper end of the rod $R^2$ is threaded and extends through a nut $R^4$ supported by the top portion of the chamber $R^1$. The chamber $R^1$ is in free communication with the adjacent trough S above the level of a vertically adjustable weir $s$. The latter forms the upper portion of a dam which may be adjusted by a nut and screw connection $s'$ between the weir plate and the top wall portion of the chamber $R^1$.

Figure 3:
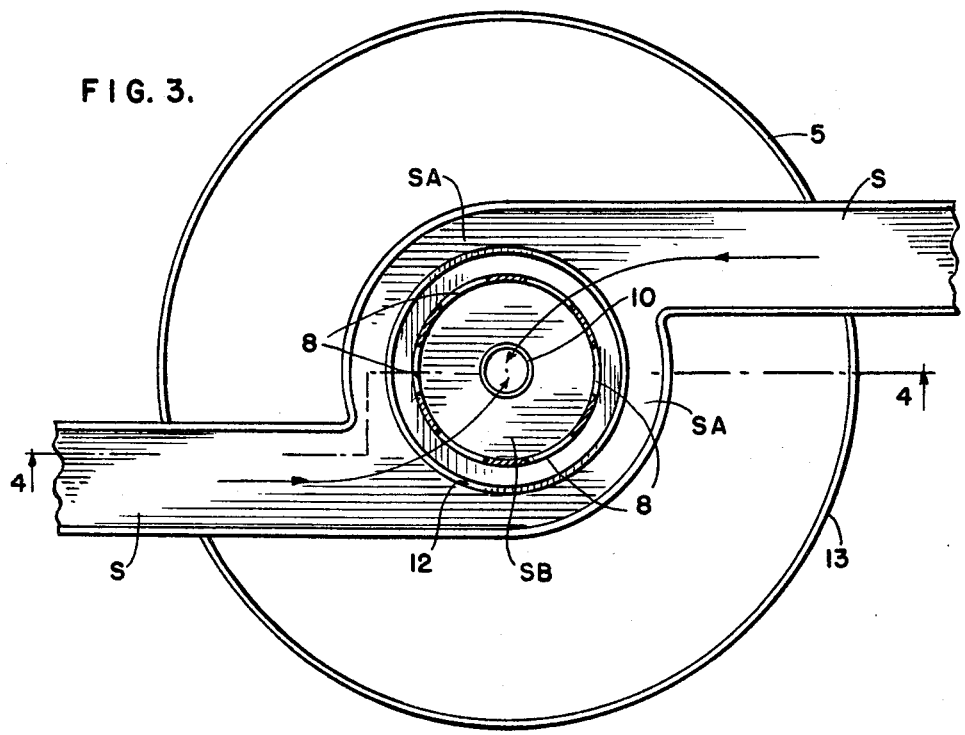
Fig. 3 is a plan section on an enlarged scale of a portion of the apparatus shown in Fig. 1, the section being taken on the broken line 3—3 of Fig. 4.
Figure 4:
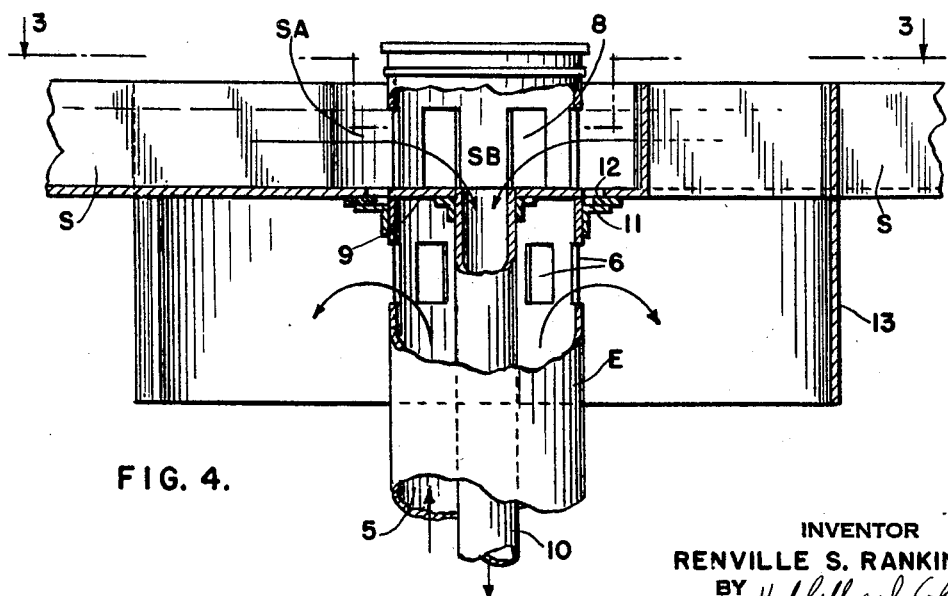
Fig. 4 is a vertical section taken on the line 4—4 of Fig. 3.

The adjacent ends of the two troughs S are connected to one another and the center column integrally connected by trough bottom wall and side extensions, as is shown best in Figs. 3 and 4. The two troughs S are parallel to, but are displaced to opposite sides of a vertical plane which intersects the center column axis. The wall parts connecting the two troughs S provide an annular chamber SA, which surrounds the upper end of the center column E and is in communication with a chamber SB within the column E by means of ports 8 formed in the column wall. A horizontal partition 9 within the column E forms a top wall for the subjacent space 5 and a bottom wall for the chamber SB. The partition 9 is formed with a central opening through which liquid and entrained solids pass from the chamber SB into the upper end of a pipe 10 which is centrally disposed in the space 5 and has its lower end connected through the pipe 4 to the aeration section $a$ of the apparatus.

The annular bottom wall of the channel SA which is rigidly connected to the troughs S, is supported by a subjacent annular flange member 11 surrounding and attached to the center column E. A washer member 12 is interposed between the flange 11 and the portion of the trough structure above the flange. The member 12 and the parts between which it is interposed, provide an effective seal between the troughs S, the channel SA, and the outer wall of the center column E, so that in normal operation there will be no significant flow of fluids or solids through the points between the trough structure and the center column. The troughs S are further connected to one another and have their connection given increased rigidity by a vertical cylinder 13. The latter is coaxial with and substantially larger in diameter than the center column E and may be welded to each of the troughs S. In addition to reinforcing and stiffening the central portion of the trough structure, the cylinder 13 serves as a vertical apron or baffle which downwardly deflects the influent passing into the main tank or chamber A from the ports 6.

Advantageously there is a central driving connection between the trough structure and the rake structure H. That connection can take various forms. As shown, it comprises arms I attached to and extending radially away from the upper portion of the rake structure H surrounding the center column. The arms I may be attached to the trough structure bottom wall at various points nearer to the cylinder 13 than to the center column E. The uprising draw-off pipes may be connected to the rake arms I, so as to provide driving connections between the slowly rotating troughs S and rake structure H.

Each trough S has a length slightly less than half the diameter of the tank A which may well be 80 feet or more. Thus the trough structure ordinarily holds a good many gallons of effluent. However, the weight of the trough structure and depending draw-off conduits R may be substantially balanced in normal operation by the flotative force of the liquid in which the troughs S and channel SA are partially submerged. Thus, as shown in Figs. 1 and 4, the liquid level in the trough S is appreciably below the liquid level in the tank.

It is believed that the general operation of the apparatus shown in Figs. 1 to 8 will be readily apparent to those skilled in the art, from the drawings and foregoing explanations, and may be summarized as follows:

The rake structure H is normally rotated slowly but continuously by the drive mechanism J. As the rake structure revolves, each scraper plate O and associated deflector plate P cooperate to work the solids deposited on the annular section of the tank floor over which the corresponding face Q is moved into an annular row narrower than said annular section. Each blade O and associated plate P also work the suspended solids in the space Q between said blade and into the narrow trailing discharge end portion of the space, and hence into position to be sucked upward by the corresponding draw-off pipe R. By suitably regulating the weir $s$ hydrostatic pressure will force the suspended solids to move through the draw-off pipes into the troughs S without a corresponding up movement of a significant amount of the solids settled on the tank floor which include practically no activated material and which are desirably worked into the solids receiving pocket or recess L in the tank bottom wall. Such regulation is effected by suitable vertical adjustment of the elevation of the lower end of each draw-off pipe from the adjacent bottom wall of the tank, and adjustment of the difference between the liquid level in the troughs S and the liquid overflow level from the tank into the launder D.

The rate at which liquid and entrained solids are moved up into the corresponding trough S by each draw-off pipe R, is dependent on the vertical adjustment of the weir plate $s$ in each chamber R which overflows into the associated trough S, and on the vertical adjustment of the circular weir plate $d$ which fixes the overflow level of the clarifier tank.

Figure 9:
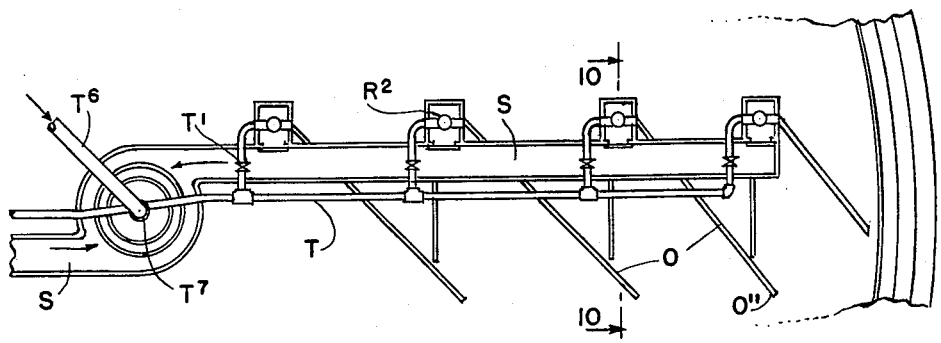
Fig. 9 is a plan view of a modified form of the apparatus shown in Fig. 5.
Figure 10:
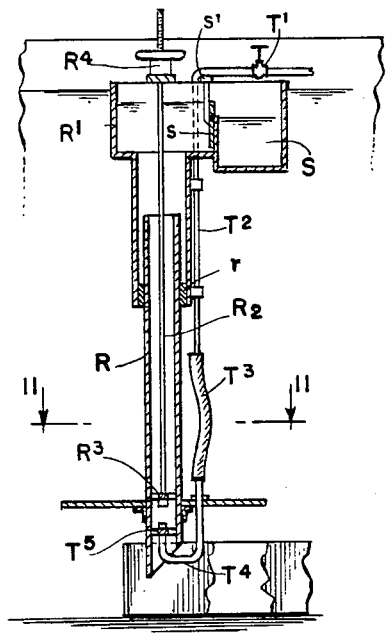
Fig. 10 is a section on the line 10—10 of Fig. 9.
Figure 11:
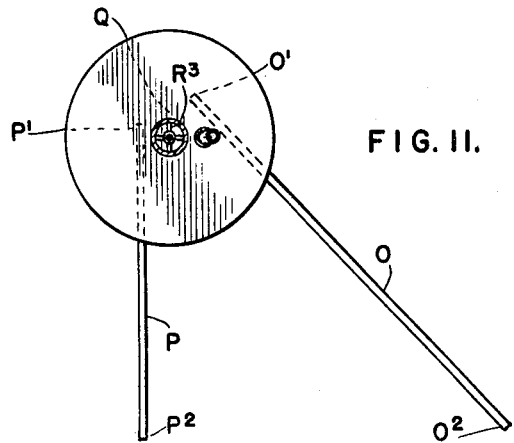
Fig. 11 is a section on the line 11—11 of Fig. 10.

As will be apparent, the apparatus illustrated in Figs. 1 and 8 may take various forms. In particular, the pressure differential between the liquid entering the lower end of each draw-off pipe and the pressure of the liquid and entrained solids entering the corresponding overflow chamber $R^1$, may be varied by the airlift action with or without vertical adjustment of the lower end of the draw-off pipe. Thus, as is shown in Figs. 9, 10 and 11, air supplied under pressure through a pipe T alongside the troughs S may be passed from that pipe into the lower end of each draw-off pipe R through a piping branch including a valve T', a depending pipe section $T^2$, a flexible hose section $T^3$, and a U-shaped pipe section $T^4$. As shown, the U-shaped pipe section $T^4$ has one uprising end or leg extending into the lower end of the pipe section $T^3$, and has its other uprising end or leg extending into the corresponding draw-off pipe R. Advantageously, the last mentioned leg is surrounded by a centering spider $T^5$ within the pipe R.

Air under pressure may be supplied to the pipe T through a pipe $T^6$ having one end connected to an unillustrated source of air pressure, and having its other end connected by a swivel joint $T^7$ to an uprising branch $T^8$ of the pipe T which is coaxial with the rake structure. With the arrangement shown in Figs. 9 to 11, the differential between the pressure in the submerged lower end of each draw-off pipe R and the pressure in the corresponding chamber R' may be regulated by the corresponding valve T'.

Figure 12:
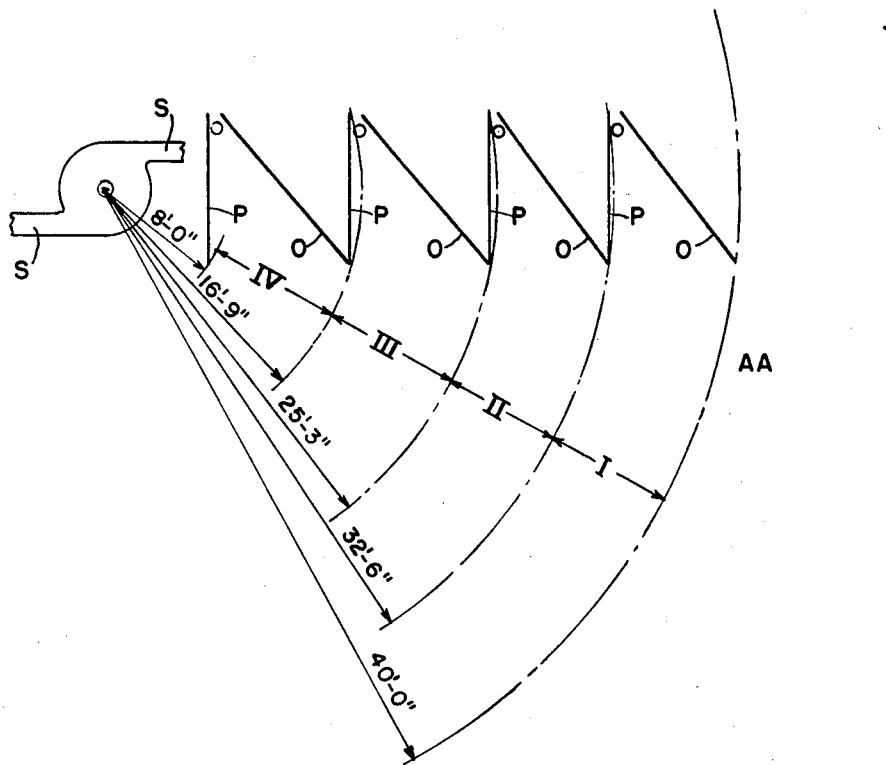
Fig. 12 is a diagram showing an arrangement of draw-off pipes and the magnitude of sludge quantities which may be handled under particular conditions in the practical use of the invention.

In Fig. 12 I have diagrammatically illustrated the normal contemplated performance of an eighty foot diameter, sewage sedimentation tank AA of the type shown in Figs. 1–11. As diagrammatically illustrated, the tank settling space comprises four annular sections I, II, III and IV, having the radial dimensions indicated in Fig. 12. The outer and inner edges of each of said sections are defined by the respective leading end of the corresponding deflector plate P and by the leading end of the corresponding scraping blade O.

The Fig. 12 diagram comprises seven side-by-side data columns, C1, C2, C3, C4, C5, C6 and C7. The section numbers I, II, III and IV appear in column C1. Columns C2 and C3 show the lengths of the outer and inner radii, respectively, of each of the four sections. Column C4 shows the areas in square feet of each of the four sections. Column C5 shows the assumed volumes of returned solids withdrawn from each of the different sections in gallons per day, and the total of those volumes. Column C6 shows the volumes of returned solids withdrawn from each of the different sections in cubic feet per second, and the total of said volumes. Column C7 shows the volumes of returned solids withdrawn from the different sections by one of the two radial troughs S from each of the annular sections in cubic feet per second.

The total volume of return of 2,513,000 gallons per day, from an eighty foot diameter sewage treatment tank having two associated rotating troughs S each with four draw-off pipes R respectively associated with the four annular sections I, II, III and IV, as indicated in Fig. 12, is believed to be an average normal performance for such a tank.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. The combination with a sedimentation tank having an inlet for liquid influent with entrained solids, an upper overflow outlet for clarified liquid, a bottom wall on which settled solids deposit, a lower outlet for said settled solids and a rake mechanism for moving solids depositing on said bottom wall to said lower outlet, of uprising draw-off conduits connected to said rake mechanism for movement by the latter over said bottom wall, and having inlets at their lower ends at levels respectively above the immediately subjacent portions of the bottom wall, and having outlets at their upper ends and arranged for the maintenance in each conduit of a differential between the fluid pressures at its lower inlet and at its upper outlet which is less than the differential between the fluid pressures in the tank at the level of the conduit inlet and at the level of said overflow outlet.

2. A combination as specified in claim 1, comprising a horizontal trough into which each conduit outlet discharges, and means for maintaining a liquid level in said trough below the liquid level in said tank.

3. A combination as specified in claim 1, comprising means for regulating the volume of flow from each outlet into the horizontal trough.

4. A combination as specified in claim 1, comprising means for producing an airlift action in each of said draw-off conduits to thereby reduce the differential between the fluid pressures at the inlet and outlet of each draw-off conduit.

5. A combination as specified in claim 1, comprising means for regulating the position of the inlet of the lower end of the uprising draw-off conduit.

6. A combination as specified in claim 1, comprising a horizontal trough attached to the rake mechanism and into which each conduit discharges, for moving solids deposited on said bottom wall, and a stationary outlet near the center of the tank into which the suspended solids passing through the rotating trough are discharged.

7. The combination with a sedimentation tank having an inlet for liquid entraining solids, an overflow outlet for liquid clarified in said tank and a bottom outlet for settled solids, of a rake mechanism movable over said bottom wall for moving solids deposited on said bottom wall to said bottom outlet and including vertically disposed scraping elements arranged in pairs to form the side walls of a plurality of side-by-side spaces extending upward from said bottom wall, the horizontal distance between the side walls of each of said spaces being tapered and having a width between the trailing ends of said side walls which is substantially smaller than the width of the portion of said space between the leading ends of its side walls, and means for withdrawing suspended solids from a portion of each of said spaces adjacent its trailing end and at a level above said bottom wall.

8. In a sedimentation tank having a bottom wall and an inlet for liquid influent with entrained settleable solids and suspended solids, and an outlet in said bottom wall for said settleable solids, a movable rake for raking settled solids toward said outlet in said bottom wall, said rake comprising a plurality of pairs of vertical extending, non-intersecting scraping elements, each pair of scraping elements having their leading edges spaced farther apart than said trailing edges thereof, and a plurality of vertically extending conduits, one for each pair of scraping elements, each conduit being operatively connected to said rake and being movable therewith, each of said conduits having an inlet spaced from the bottom wall of said tank and being disposed adjacent the trailing edges of said scraping elements, and means for selectively drawing said liquid and suspended solids into said conduits through the respective conduit inlets.

9. In a sedimentation tank having a substantially cylindrical peripheral side wall and a bottom wall, said tank being provided with an inlet for liquid influent having entrained settleable and suspended solids, said tank further being provided with an outlet for settled solids in said bottom wall and an outlet for clarified liquid adjacent the surface of said liquid; the combination comprising a rake rotatable about an axis substantially coincident with the longitudinal axis of said peripheral side wall for raking settled solids toward the outlet in said bottom wall, said rake comprising a plurality of pairs of vertical extending, non-intersecting scraping elements, said pairs of scraping elements being disposed at different distances from said axis of rotation of said rake, each pair of scraping elements having their leading edges spaced farther apart than said trailing edges thereof, and a vertically extending conduit associated with each pair of scraping elements and being movable with said rake, each of said conduits having an inlet spaced from the bottom wall of said tank and being disposed adjacent the trailing edges of said scraping elements, and means for selectively drawing said liquid and suspended solids into said conduits through the respective conduit inlets.

10. A rotatable rake for raking settled solids toward a substantially centrally located outlet in the bottom wall of a cylindrical sedimentation tank, said rake comprising a pair of vertically extending, angularly related, non-intersecting scraping elements, the leading edges of said scraping elements being farther apart than the trailing edges thereof, said scraping elements both being on one side of said outlet.

11. A movable rake for raking settled solids toward an outlet in the bottom wall of a sedimentation tank, said rake comprising a horizontally extending member and a plurality of pairs of adjacent vertically extending, angularly related, non-intersecting scraping elements, said pairs of scraping elements being connected to said horizontally extending member and being distributed along its length, the leading edges of each pair of scraping elements being farther apart than the trailing edges thereof.

12. A rotatable rake mechasm for raking settled solids along the bottom wall of a sedimentation tank toward an outlet in said bottom wall, said rake mechanism comprising a horizontal member rotatably mounted at the center thereof, a horizontally extending member and a plurality of pairs of vertically extending, angularly related, non-intersecting scraping elements, said pairs of scraping elements being connected to said horizontally extending member and being distributed along its length on both sides of the center, the leading edges of each pair of scraping elements being farther apart than the trailing edges thereof.

13. A sedimentation tank for clarifying liquids having settleable and suspended solids entrained therein, said tank having a cylindrical peripheral side wall and a bottom wall sloping downwardly from said peripheral side wall to the longitudinal axis of said peripheral side wall, said tank having an inlet for said liquid and entrained solids located on said central axis of said peripheral side wall and spaced above said bottom wall of said tank, said tank further having an outlet for clarified liquid located along the peripheral side wall of said tank and another outlet for settled solids provided in said bottom wall adjacent the center thereof, a rake mechanism for raking settled solids on said bottom wall toward said outlet for settled solids, said rake mechanism comprising a horizontal member extending diametrically across said tank and being rotatably mounted at the center thereof, a plurality of pairs of vertically extending angularly related non-intersecting scraping elements carried by said horizontal member and being distributed along its length on both sides of the center thereof, the leading edges of each pair of scraping elements being farther apart than the trailing edges thereof, and a plurality of vertically extending conduits, one for each pair of scraping elements, said conduits being fixed relative to said horizontal member for movement therewith, each of said conduits having an inlet disposed above said bottom wall and in between said leading and trailing edges of its associated scraping elements and immediately adjacent said trailing edges, and means for selectively drawing said liquid and suspended solids and into said conduits through the respective conduit inlets.

References Cited in the file of this patent

UNITED STATES PATENTS

| | | |
|---|---|---|
| 1,392,214 | Peck | Sept. 27, 1921 |
| 1,900,809 | Hammerly | Mar. 7, 1933 |
| 1,916,460 | Bousman | July 4, 1933 |

FOREIGN PATENTS

| | | |
|---|---|---|
| 143,369 | Great Britain | May 27, 1920 |
| 365,630 | Great Britain | Jan. 20, 1932 |
| 523,876 | Great Britain | July 24, 1940 |
| 757,476 | Great Britain | Sept. 19, 1956 |